Figure 1:
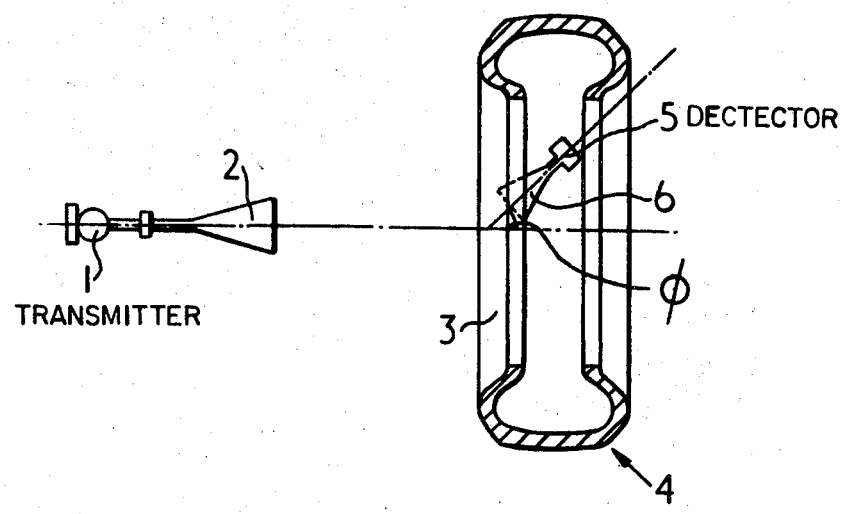

United States Patent

Searle et al.

[15] 3,648,164
[45] Mar. 7, 1972

[54] A METHOD AND APPARATUS FOR DETECTING REINFORCEMENT SPACING VARIATION BY MICROWAVE DIFFRACTION

[72] Inventors: Eric H. Searle; Eric G. Gould, both of Sutton Coldfield, England

[73] Assignee: Dunlop Holdings Limited, London, England

[22] Filed: Apr. 28, 1970

[21] Appl. No.: 32,599

[30] Foreign Application Priority Data

May 9, 1969 Great Britain......................23,637/69

[52] U.S. Cl. ..........................................324/58.5 A, 73/146
[51] Int. Cl. .......................................................G01n 27/04
[58] Field of Search ..................324/37, 58.5, 61, 58; 73/146

[56] References Cited

UNITED STATES PATENTS

| 3,549,986 | 12/1970 | Prine | 324/58.5 |
|---|---|---|---|
| 3,278,841 | 10/1966 | Hanson et al. | 324/58.5 |
| 3,418,567 | 12/1968 | Mandula et al. | 324/37 |
| 2,849,675 | 8/1958 | Hall et al. | 324/61 |

Primary Examiner—Edward E. Kubasiewicz
Attorney—Stevens, Davis, Miller & Mosher

[57] ABSTRACT

A method and apparatus for detecting variation in the spacing of an array of conducting strands embedded within a rubber or plastics medium. A transmitter of microwave radiation is placed on one side of the array and a detector on the opposite side, the frequency of the radiation being chosen so that the transmission of the signal through the array is affected by the spacing of the conducting strands. The array is moved past the transmitter and the detector, any variation in strand spacing being shown by a variation in the signal received by the detector, of which the following is a specification.

12 Claims, 2 Drawing Figures

Patented March 7, 1972

3,648,164

2 Sheets-Sheet 1

A METHOD AND APPARATUS FOR DETECTING REINFORCEMENT SPACING VARIATION BY MICROWAVE DIFFRACTION

This invention relates to the testing of reinforced articles, particularly those made of rubber or plastics and reinforced with steel cords.

In the construction of reinforced rubber or plastics articles such as pneumatic tires, conveyor belts, containers and the like it is important that the reinforcing cords should be uniformly spaced over that part of the article in which they are situated, e.g., the sidewall of a pneumatic tire, otherwise part of the article will be weaker than the remainder and early failure will result. However, once the reinforcing cords have been embedded in rubber or plastics it is only possible to detect a fault, e.g., a distorted or missing cord, by means of X-ray techniques which are relatively expensive and time consuming. In the case of pneumatic tires an enlarged spacing may arise during the shaping due to faulty building of the carcass, and it is this type of fault which the present invention is more particularly designed to detect thus avoiding the use of the aforementioned techniques.

According to the invention an apparatus for detecting a variation in the spacing of a substantially equally spaced array of electrically conducting strands embedded within a rubber or plastics article comprises a transmitter for transmitting a beam of microwave radiation of a frequency appropriate to obtain a detectable signal according to the variation in the strand spacing, a detector located on the side of the array opposite to the transmitter for detecting a local change in intensity of microwave radiation due to said variation in spacing and means for relatively moving the transmitter, the detector and the article.

The apparatus may particularly be used, e.g., for detecting a variation in the regular spacing of the steel cords of a radial ply pneumatic tire. It may include a suitable indicating or recording means and/or an accept/reject device.

In one example of the invention the transmitter comprises a klystron and an associated radiating horn, and the detector a crystal and an associated collecting horn. Other types of transmitter or detector may be used, e.g., a Gunn Diode in place of the klystron.

According to a further aspect of the invention a method of detecting a variation in the spacing of an array of conducting strands embedded within a rubber or plastics medium comprises placing the array between a transmitter for transmitting a beam of microwave radiation and a detector for detecting a variation in the intensity of microwave radiation, and moving the array relative to the detector so that any variation in the strand spacing causes a variation in the intensity of the radiation which is detected by the detector.

The appropriate frequency of the radiation is preferably in the range 14 to 36 GHz., i.e., such that the wavelength is approximately of the same order of magnitude as the strand spacing.

The physical principles of the method are as follows:

When a grid of parallel strands is interposed between the transmitter and the detector, with the plane of the grid perpendicular to the axis of the transmitter and detector, a field will be produced at the detector, the shape and intensity of which will depend on the spacing between the strands and the wavelength of the radiation transmitted. For a given spacing, when the wavelength is increased, the intensity of the field due to the radiation transmitted through the grid is reduced and can be made very small. If the distance between two adjacent strands on the axis of the transmitter and detector is now increased, i.e., there is an enlargement in the spacing of the regular array, the field intensity of transmitted radiation is increased relatively.

If the detector is moved in the arc of a circle about the enlarged spacing as center the transmitted field intensity is found to vary, exhibiting several maxima and minima, characteristic of a diffraction pattern at a single slit. A secondary result of this arcuate movement, i.e., setting the detector at an angle to the original axis, is that the field intensity due to the radiation transmitted through the regularly spaced grid is diminished. It is therefore possible to select a particular angular setting of the detector to obtain the optimum discrimination between the intensity of the field due to the enlarged spacing and the intensity of the field due to the regularly spaced grid (the "background" intensity) and in the particular case of steel wire reinforced tires the optimum angular setting is on the third or fourth order maximum.

All the foregoing phenomena are enhanced when the strands are parallel to the electric field vector of the microwave radiation as distinct from its magnetic field vector. If the strands are at an angle to the electric field vector the intensity is reduced by a factor equal to the cosine of the angle.

Figure 2:
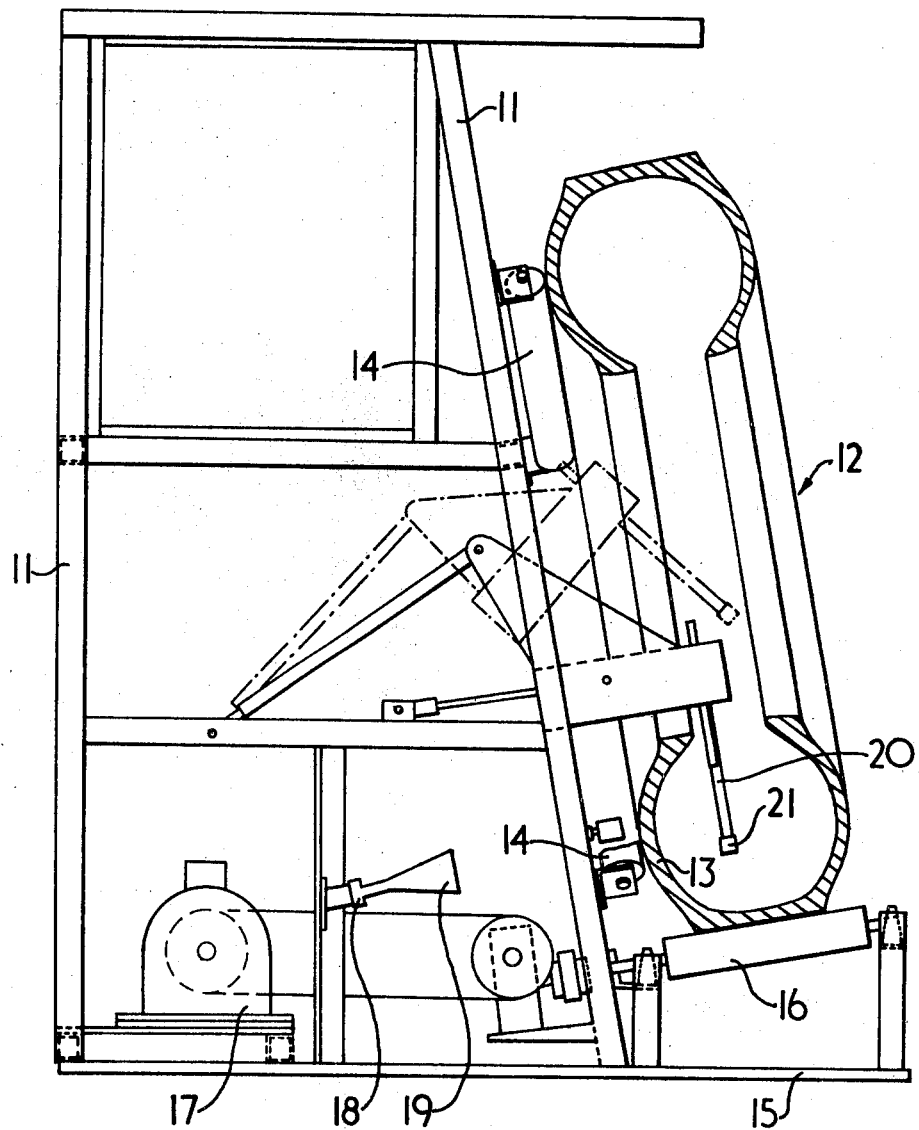

The invention is illustrated in FIGS 1 and 2 of the accompanying drawings which show in plan and in side elevation respectively, the layout of the transmitter and detector for detecting variation in cord spacing in the sidewall of a steel cord reinforced radial ply tire.

A transmitter consisting of a klystron 1 and horn 2 is positioned to transmit microwave radiation in a direction normal to a sidewall 3 of a tire 4.

A detector consisting of a crystal 5 and horn receiver 6 is positioned inside the tire, the horn receiver 6 being aligned in the same plane as the horn 2 but in a direction at an angle $\phi$ to the direction of alignment of the horn 2.

The frequency of the microwave radiation transmitted by the klystron 1 is chosen to be such that a diffraction pattern is set up by its passage through an enlarged space in the array of parallel steel cords in the sidewall 3 of the tire 4, e.g., a space of 1.5 to 2 times the correct value. The angle $\phi$ is chosen to lie on the third or fourth maximum of the diffraction pattern thus set up.

In operation the tire sidewall 3 is moved between the transmitter and the receiver and enlargements in cord spacing in the sidewall give rise to high readings on the receiver.

An apparatus for detecting a variation in the spacing of the steel cords of a radial ply tire in accordance with the invention will now be described by way of example with reference to FIG. 2 of the accompanying drawings which is a side elevation of the apparatus, showing only the main features of the apparatus.

The apparatus of the invention comprises a framework 11 on which a tire 12, e.g., of size 11.00×20 or 12.00×20 may be rotatably mounted for testing. During testing one of the tire sidewalls 13 engages with four freely rotatable rollers 14 (only two of which are shown) equiangularly disposed with respect to the tire 12 and secured to the front face of the framework 11. In front and at the bottom of the front face is a small platform 15 having two rotatable rollers 16 mounted thereon on which the tire is stood during testing. The plane of the front face of the framework 11 is tilted at about 10° to the vertical while the plane of the platform 15 is about 10° to the horizontal, the planes of the front face and platform being mutually perpendicular, so that when a tire 12 is in position for testings its midcircumferential plane is also about 10° from the vertical.

During testing the tire 12 is rotated slowly about its own axis and this is effected by driving the two rollers 16 mounted on the platform by means of an electric motor 17 mounted on the framework 11 through a suitable chain drive and sprocket system.

Mounted behind the front face of the framework 11 is a klystron 18 and associated radiating horn 19 for directing a beam of microwave radiation of frequency about 22 GHz. at the tire sidewall 13 nearer the front face of the apparatus adjacent the lowest point of the tire. Also movably mounted on the framework 11 on an arm 20 is a crystal detector 21 and detecting horn (not shown). Since the cords are radial they are vertical in the part of the sidewall being tested and so the electric field vector of the radiation is also arranged to be vertical for optimum conditions. When a tire 12 is in position on the rollers 16 ready for testing to commence this detector 21 and arm 20 may be moved outwardly from a retracted position on the framework through the plane of the front face and downwardly between the beads into the interior of the tire adjacent the lowest point thereof to the position shown in the drawing in full lines by means of a suitable electropneumatically operated lever mechanism (not shown). When in position the crystal is situated at an angle to the direction of the beam such that the crystal detects the third or fourth order maximum in the transmitted field intensity of an enlarged cord spacing.

The transmitted field intensity detected is shown on a suitable meter and/or recorded on a trace. A chalk marker device mounted on an electropneumatically controlled arm is actuated on receipt of a suitable signal from the detector to mark the tire at a point where an enlarged space is detected.

Initially before testing tires, the apparatus is set up in the manner described earlier in this specification using a tire which is known to have an enlarged spacing of the order of 1.5 to 2 times the desired spacing. In this way the crystal detector is set at that order of maximum which has optimum discrimination over background intensity for the size and type of tire being tested.

In use the klystron is switched on and left so for some time to ensure a stable operating condition, a tire to be tested is rolled into position on the platform and rotated through one or two complete rotations by means of the two motor-driver rollers so that it is in the correct position with all four rollers on the front face engaging the tire sidewall. The detector is then lowered into position in the interior of the tire and rotation of the tire commenced. As the tire is rotated the intensity of the field detected by the crystal varies and is recorded on a suitable trace. In addition the marker device marks the tire at points where enlarged spaces are detected. When the tire has been rotated once, the motor automatically stops and the detector retracts. The tire is then reversed and the whole process repeated for the opposite sidewall.

For different size tires or other articles to be tested it may be desirable to use a different microwave wavelength/frequency and it has been found that dependent on the following criteria useful frequencies lie in the range 14 to 36 GHz. The first criterion for selecting the wavelength is that very little radiation should be transmitted through the regularly spaced array, i.e., the background intensity should be very low. However, as the wavelength is increased the intensity of the field transmitted through a small enlargement is decreased and there is therefore a second criterion to meet in that there is a limit to the wavelength usable in that it must be able to give rise to a sufficiently large transmitted field intensity for the smallest enlarged spacing which the apparatus is desired to detect, i.e., a space equal to normal spacing between cords plus approximately 0.8 of a cord width. Although the size of the signal increases with the size of enlarged spacing there is no direct relationship, but by using a wavelength within two aforementioned criteria it is possible to select a wavelength for a given cord spacing which permits the detection of an enlarged spacing greater than the significant minimum. It is also possible, by suitable compromise, to select a wavelength which will be suitable for a range of spacings, so that one apparatus may be used for different sizes or types of radial ply steel tires.

On account of the comparatively high dielectric constant of rubber (about 16) the wavelength of the microwave radiation is of the order of a quarter of that in free space. Consequently any variation in dielectric constant due, for example, to slight changes in compound constituents of the rubber, will result in variation of the transmitted field intensity for a given enlarged spacing. In addition slight changes of curvature and/or thickness of the sidewall (at which refraction of the radiation occurs) and variations in the loss factor of the rubber will also cause variations. However, it is possible to overcome these variations by setting the reject level of transmitted field intensity with respect to the background intensity rather than with respect to an absolute value.

Having now described our invention what we claim is:

1. Apparatus for detecting a variation in the spacing of a substantially equally spaced array of electrically conducting strands embedded within a rubber or plastics article comprising a transmitter for transmitting a beam of microwave radiation of a frequency appropriate to obtain a diffraction of the radiation by the array of conducting strands, a detector located on the side of the array opposite to the transmitter in a position to receive microwave radiation diffracted from said beam by said equally spaced strands whereby a variation in the spacing of the strands gives rise to a change in intensity of the diffracted radiation received by the detector and means for relatively moving the transmitter, the detector and the article.

2. Apparatus according to claim 1 wherein said array of strands embedded within a rubber or plastics article comprises regular spaced steel cords in a pneumatic tire.

3. Apparatus according to claim 2 in which the tire is a radial ply carcass pneumatic tire and the steel cords are in the sidewall of the tire.

4. Apparatus according to claim 3 which includes rotatable rollers by which the tire is rotated in use of of the apparatus to pass the sidewall of the tire between the transmitter and the detector.

5. Apparatus according to claim 1 in which the transmitter comprises a klystron and a radiation horn.

6. Apparatus according to claim 1 in which the detector comprises a crystal and a collecting horn.

7. Apparatus according to claim 1 which includes means for marking the article at a position where variation in spacing of the strands is detected.

8. The apparatus of claim 1 including means to cause the transmitter to emit a signal having a wavelength of approximately the same magnitude as the strand spacing.

9. A method of detecting a variation in the spacing of an array of conducting strands embedded within a rubber or plastics medium which comprises placing the array between a transmitter for transmitting a beam of microwave radiation and a detector for detecting diffraction of the radiation by the array of conducting strands and moving the array relative to the detector so that any variation in the strand spacing causes a change in the intensity of the defracted radiation which is received by the detector.

10. A method according to claim 9 wherein said array of conducting strands embedded within a rubber or plastics medium comprises at least a part of a cord reinforced pneumatic tire in which the cords are steel cords.

11. A method according to claim 10 wherein said tire is a radial ply tire, said part being a sidewall of the tire.

12. A method according to claim 9 including energizing said transmitter to a frequency of the microwave radiation is in the range 14 to 36 GHz.

* * * * *